UNITED STATES PATENT OFFICE.

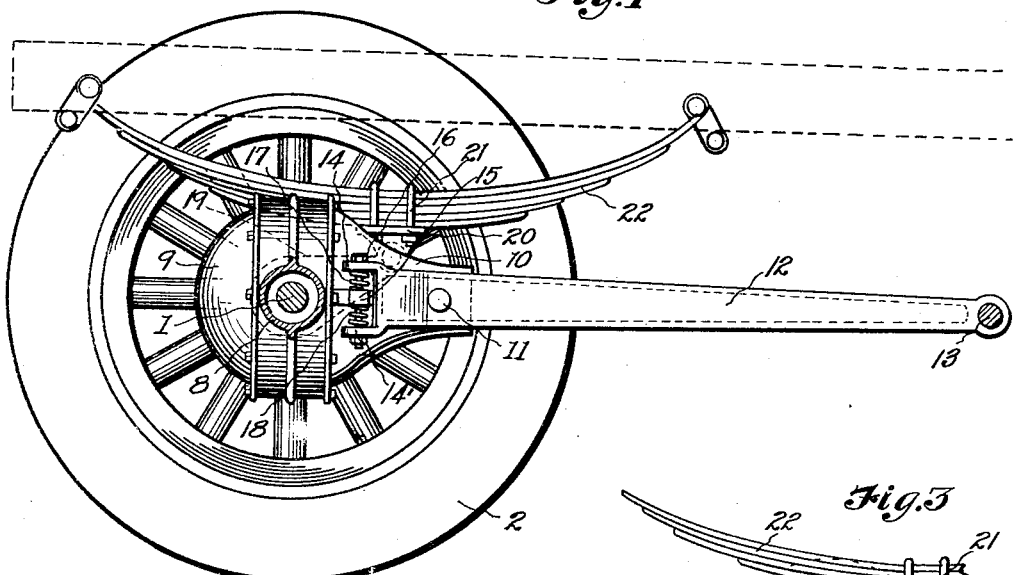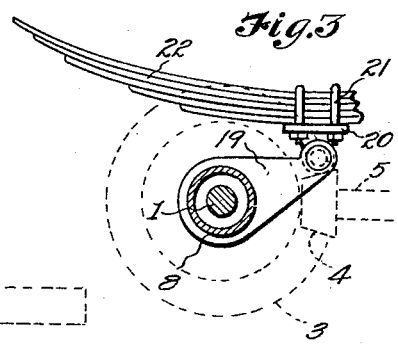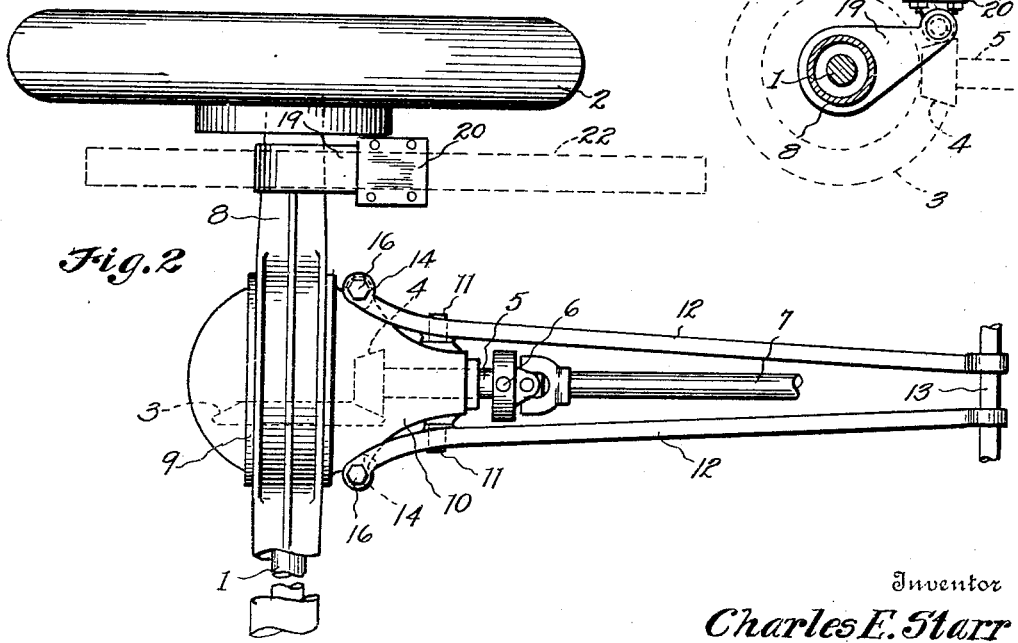

CHARLES E. STARR, OF BELLINGHAM, WASHINGTON, ASSIGNOR TO PERFECTO GEAR DIFFERENTIAL CO., OF BELLINGHAM, WASHINGTON, A CORPORATION OF WASHINGTON.

SPRING HANGER FOR AUTOMOBILES.

1,410,133.

Specification of Letters Patent. Patented Mar. 21, 1922.

Application filed March 1, 1920. Serial No. 362,259.

*To all whom it may concern:*

Be it known that I, CHARLES E. STARR, a citizen of the United States, and resident of the city of Bellingham, county of Whatcom, and State of Washington, have invented certain new and useful Improvements in Spring Hangers for Automobiles, of which the following is a specification.

This invention relates to improvements in automobile construction and more particularly to spring or body mountings and the manner in which they are applied to the axle housing wherein the vehicle driving axle is contained, together with torque arms of novel construction and application.

The principal object of the invention is to provide body or spring mountings of a certain novel character which act co-operatively with torque arms of special construction, so that the point of support of a load as applied to the driving axle of a vehicle will be moved forward of the axle a distance sufficient to materially reduce the power necessary to lift or drive the wheels of the vehicle over bumps or small obstructions in the roadway.

In accomplishing this object I have provided the improved details of construction, the preferred forms of which are illustrated in the accompanying drawings, wherein:

Figure 1 is a sectional view through the rear or driving axle of a vehicle equipped with spring mountings and torque arms constructed and applied in accordance with the present invention.

Figure 2 is a plan view of the same.

Figure 3 is a side view of the spring mounting, showing its length with respect to the size of the driving master gear.

Referring more in detail to the drawings, 1 designates a section of the rear driving axle of an automobile, which is connected at its outer end to a ground or driving wheel 2 and at its inner end has driving connection with the master gear 3, shown in dotted lines in Figures 2 and 3; the latter being driven by a pinion 4 connected by a shaft section 5 and universal connection, as indicated at 6, with a power shaft 7 which extends to the vehicle engine, not shown.

The axle 1 and differential mechanism are enclosed by a housing comprising the tubular axle enclosing portions 8 and an enlarged differential housing 9, which has a forwardly extended portion 10 wherein bearings are mounted to operatively support the shaft 5 and driving pinion 4.

Extending laterally from opposite sides of the extended portion 10 of the differential housing are pivot pins 11 and pivotally mounted thereon are torque arms 12 which, at their forward ends, are pivotally mounted on a cross rod 13 that is supported by the vehicle frame, and at their rearward ends are curved slightly to conform to the curve of the differential housing and have vertically spaced-apart extensions 14, 14', forming yokes which extend about lugs or projections 15, cast integrally with or fixed to the housing.

Bolts 16 extend through the yoke members and lugs about which springs 17 and 18 are coiled to bear against the lugs and torque arm extensions to form connection that will yieldingly resist the turning tendency of the housing while the vehicle is being driven.

Mounted at the outer ends of the housing sections 8 are forwardly extending spring or body supporting brackets 19 which form the supporting connection between the rear axle housing and the vehicle frame.

In this construction the outer ends of the brackets have bearing plates 20 pivotally mounted thereon for receiving U-bolts or the like, 21, whereby springs 22 may be mounted and which latter in turn support the vehicle frame and body.

It is desirable also, as here shown, that the length of the brackets be equal to the radius of the pitch circle of the master gear of the differential mechanism through which the vehicle is driven.

Assuming that the parts are so constructed and assembled as described, it is apparent that a vertical line through the point of support of a load, as applied through the springs 22 and brackets or mountings to the supporting axle 1, will pass forwardly of the axle a distance which in practice would be from four to six inches.

Assuming that the vehicle is being driven forwardly, it is apparent that the natural resistance of the load to be moved will cause the shaft 5, which carries the driving pinion to exert an upward pressure on the extended portion 10 of the axle housing. It is also apparent that since the brackets and housing are rigid with respect to each other, the weight of the load is in effect applied at some distance forward of the axle 1, and is supported partially through the two torque arms.

If, while the vehicle is traveling, the ground wheels should strike any obstruction which it would require more than normal power to move them over, it is apparent that in the present case the point of support of the load being forward of the obstruction, will in a way tend to carry the wheels across the obstruction, as the yieldable members at the ends of the torque arm permit a certain rotative motion of the housing which permits the wheels to be carried over the obstruction without the load being lifted from its horizontal line of travel.

What I claim as new, is:

1. In a vehicle of the character described, in combination with the driving axle housing and a torque arm for yieldingly permitting a limited rotative movement of the housing of a spring hanger rigidly mounted on the axles and extending forwardly thereof whereby the point of support of the load is moved forwardly of the axle.

2. In a vehicle of the character described, the combination with a housing for the driving axle and differential driving mechanism thereof, of a spring hanger rigidly mounted on the said axle housing and extending forwardly therefrom and having means at its forward end for supporting the vehicle load and a torque arm pivotally fixed at its forward end to the vehicle frame and at its rearward end having yieldable connection with the said housing to limit the rotative movement thereof.

3. In a vehicle of the character described, the combination with the housing enclosing the driving axles and differential driving gearing, of spring hangers rigidly mounted on the axle housing and extending forwardly therefrom to support the vehicle load at their outer ends, torque arms pivotally fixed at their forward ends to the vehicle frame and intermediate their ends pivotally connected to the differential housing forwardly of the axle and at their rearward ends having yoke arms extended on opposite sides of stop members extending from said housing and compression springs interposed between said arms and stops to yieldingly permit a limited rotative movement of the housing for the purpose set forth.

Signed at Seattle, Washington, this 17 day of February, 1920.

CHARLES E. STARR.